United States Patent
Sampath et al.

(10) Patent No.: US 8,061,938 B2
(45) Date of Patent: Nov. 22, 2011

(54) CUTTING TOOL WITH CHISEL EDGE

(75) Inventors: Karthik Sampath, Latrobe, PA (US); Juergen Schwaegerl, Vohenstrauss (DE)

(73) Assignee: Kennametal Inc., Latrobe, PA (US)

( * ) Notice: Subject to any disclaimer, the term of this patent is extended or adjusted under 35 U.S.C. 154(b) by 862 days.

(21) Appl. No.: 12/075,299

(22) Filed: Mar. 10, 2008

(65) Prior Publication Data

US 2009/0226271 A1 Sep. 10, 2009

(51) Int. Cl.
  B23B 51/02 (2006.01)
  B23B 51/00 (2006.01)
(52) U.S. Cl. .............................. 408/230; 408/233
(58) Field of Classification Search .................. 408/230, 408/227, 233, 231
See application file for complete search history.

(56) References Cited

U.S. PATENT DOCUMENTS

| | | | |
|---|---|---|---|
| 1,467,491 A * | 9/1923 | Oliver | 408/230 |
| 2,332,295 A * | 10/1943 | Bouchal | 408/211 |
| 3,977,807 A | 8/1976 | Siddall | |
| 4,527,643 A | 7/1985 | Horton et al. | |
| 4,565,473 A | 1/1986 | Hosoi | |
| 5,141,369 A | 8/1992 | Palace | |
| 5,350,261 A * | 9/1994 | Takaya et al. | 408/229 |
| 5,486,075 A | 1/1996 | Nakamura et al. | |
| 6,036,410 A * | 3/2000 | Shun'ko | 408/230 |
| 6,132,149 A | 10/2000 | Howarth et al. | |
| 6,309,149 B1 | 10/2001 | Borschert et al. | |
| 6,419,561 B1 | 7/2002 | George | |
| 6,739,809 B2 * | 5/2004 | Shaffer | 408/230 |
| 6,923,602 B2 | 8/2005 | Osawa et al. | |
| 7,140,815 B2 | 11/2006 | George et al. | |
| 7,267,514 B2 | 9/2007 | Wetzl et al. | |
| 2001/0018013 A1 * | 8/2001 | Eng et al. | 408/144 |
| 2003/0039522 A1 | 2/2003 | Yanagida et al. | |
| 2003/0175086 A1 | 9/2003 | Muhlfriedel et al. | |
| 2003/0188895 A1 | 10/2003 | Osawa et al. | |
| 2006/0039767 A1 * | 2/2006 | Yamamoto et al. | 408/230 |
| 2007/0160437 A1 * | 7/2007 | Shultz et al. | 408/230 |
| 2007/0274795 A1 | 11/2007 | Cirino | |

\* cited by examiner

*Primary Examiner* — Daniel W. Howell
*Assistant Examiner* — Paul M Janeski
(74) *Attorney, Agent, or Firm* — Larry R. Meenan

(57) ABSTRACT

A twist drill has double margins and a chisel edge angle of between 80 degrees and 100 degrees to maximize hole straightness and to minimize "walking" of the drill upon a workpiece. The drill may be modular having a removable tip body or the drill may be of a solid configuration. A tip body is consumable and may be removed and replaced as required.

18 Claims, 4 Drawing Sheets

CUTTING TOOL WITH CHISEL EDGE

BACKGROUND OF THE INVENTION

1. Field of the Invention

The invention relates to a cutting tool, such as a twist drill, having a uniquely oriented chisel edge.

2. Description of Related Art

It is important in the drilling of brittle materials such as grey cast iron to drill a circular hole at a desired location and in a straight direction with "hole straightness". During the drilling process, not only is it possible for the drill to "walk" across the surface of a workpiece away from the target location but, furthermore, even when the drill is positioned at the proper target location, asymmetrical cutting forces upon the drill may cause the drill to wobble, thereby producing a non-circular hole, a hole that is not straight, or both. U.S. Pat. No. 3,977,807 issued Aug. 31, 1976, is directed to a double margin twist drill having a chisel edge that forms a chisel edge angle with the corner of the primary margin. While FIG. 2 of this patent illustrates this feature, it is difficult to discern the chisel edge angle because FIG. 2 is a perspective view. Nevertheless, the outer diameter of the primary margin reduces as the margin approaches the chisel edge and, as a result, some drill stability is sacrificed.

U.S. Pat. No. 7,267,514 issued Sep. 11, 2007, is directed to a self-centering bit drill with a pilot tip, wherein the drill has only a single margin. This patent discloses in FIG. 4, an arrangement, whereby the chisel edge is essentially parallel with the drill margin. While this reduces the "walking" of the drill, the same problem exists with respect to hole shape and hole straightness because the drill tends to wobble while drilling.

A drill design is needed that makes straighter and better located holes, and that stabilizes the drill within the hole during the hole making process.

SUMMARY OF THE INVENTION

The tip of a generally cylindrical cutting tool is used for making a hole within a workpiece, wherein the tip has a central axis and a cutting end. The tool is designed to rotate in a cutting direction. The tip comprises a body having two diametrically opposed flutes with lands therebetween, wherein the lands each have a pair of edges defined as a leading edge and a trailing edge defined by the rotation of the tool. A primary margin and a secondary margin are spaced apart from one another on each of the lands. The primary margin is adjacent to the leading edge and the margins have the margin diameter along the entire length of the body that is constant. A cutting lip extends inwardly from the leading edge of each land to an innermost end. A chisel edge is defined by a line connecting the innermost end of each cutting lip, wherein, when viewed along the central axis, the chisel edge forms a chisel edge angle with a line extending radially inward from the leading edge of the land to the midpoint of the chisel edge. The chisel edge angle is between 80 degrees to 100 degrees. The subject invention is also directed to a rotatable cutting tool having a tip as described above.

DETAILED DESCRIPTION OF THE INVENTION

Figures 1, 1A:
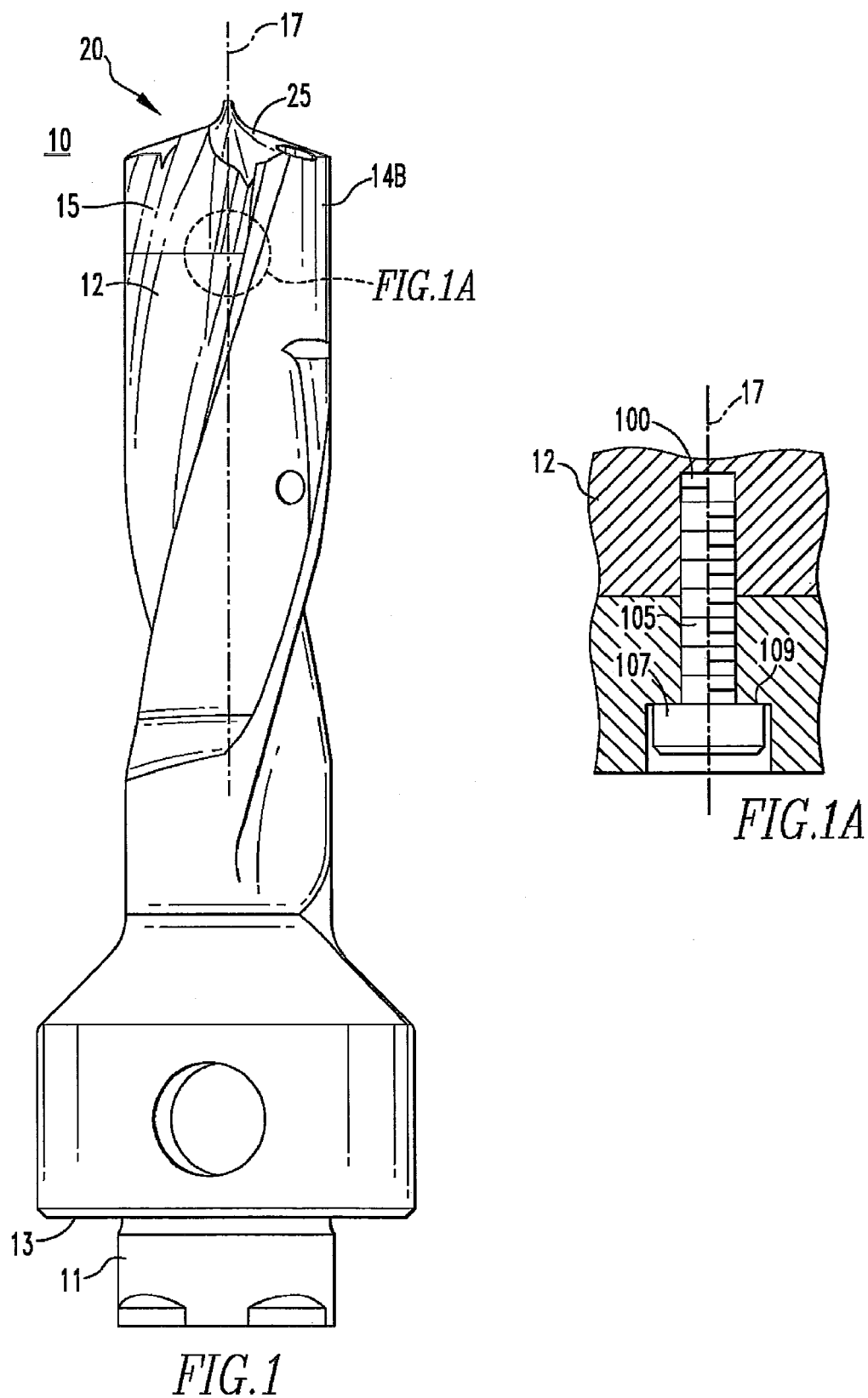
FIG. 1 is a side view of a modular twist drill having a cutting tool secured to the shank of the drill.
FIG. 1A is an enlarged cutaway detail of the encircled area identified as A in FIG. 1.
Figure 2:
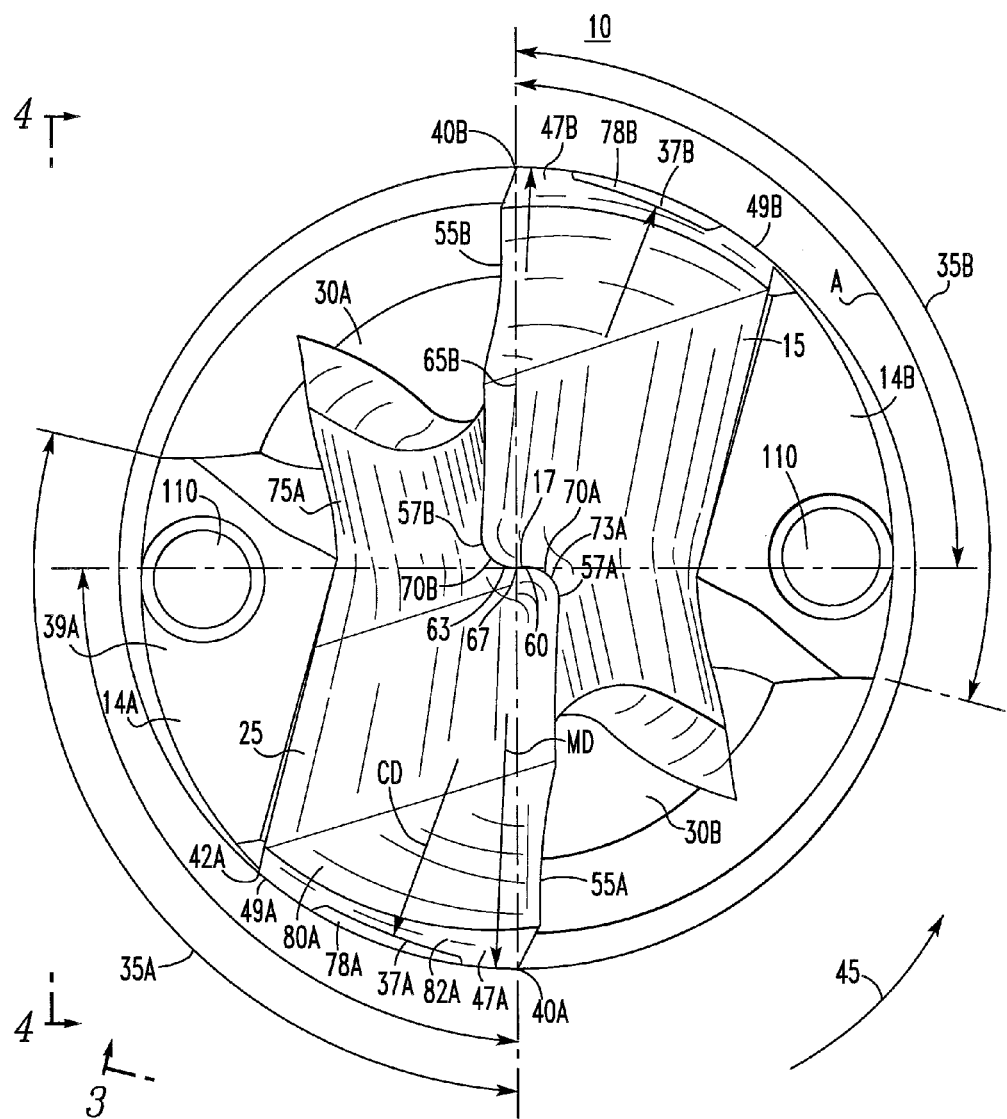
FIG. 2 is a top view of the twist drill in FIG. 1.

FIG. 1 illustrates a rotatable cutting tool 10 which, as an example, is a twist drill. The cutting tool 10 has a tip 15 at the cutting end 20. The tip 15 has a central axis 17 extending therethrough. As illustrated in FIG. 2, the tip 15 has a tip body 25 with two diametrically opposed flutes 30A, 30B. In between each flute 30A, 30B about the periphery of the cutting tool 10 are lands 35A, 35B. Each land 35A, 35B is made up of a tip body land 37A, 37B and a prong land 39A, 39B.

Figure 3:
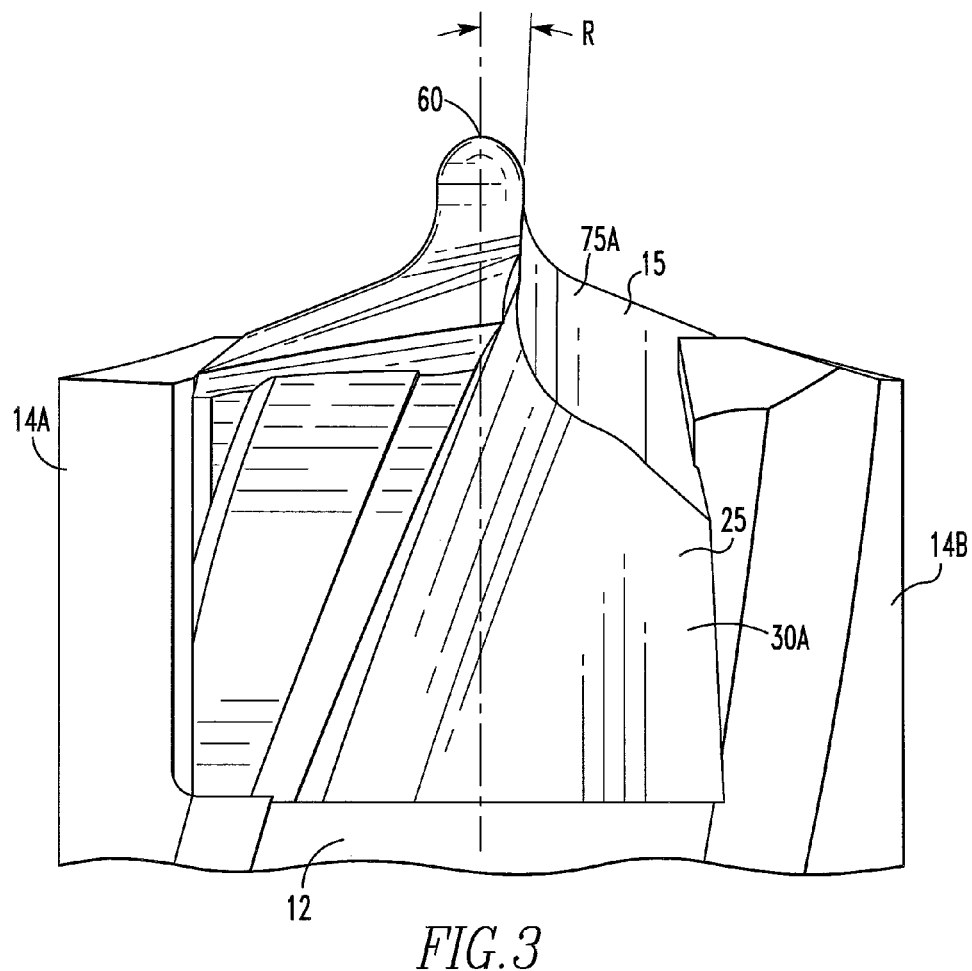
FIG. 3 is a side view along arrows "3-3" in FIG. 2.
Figure 4:
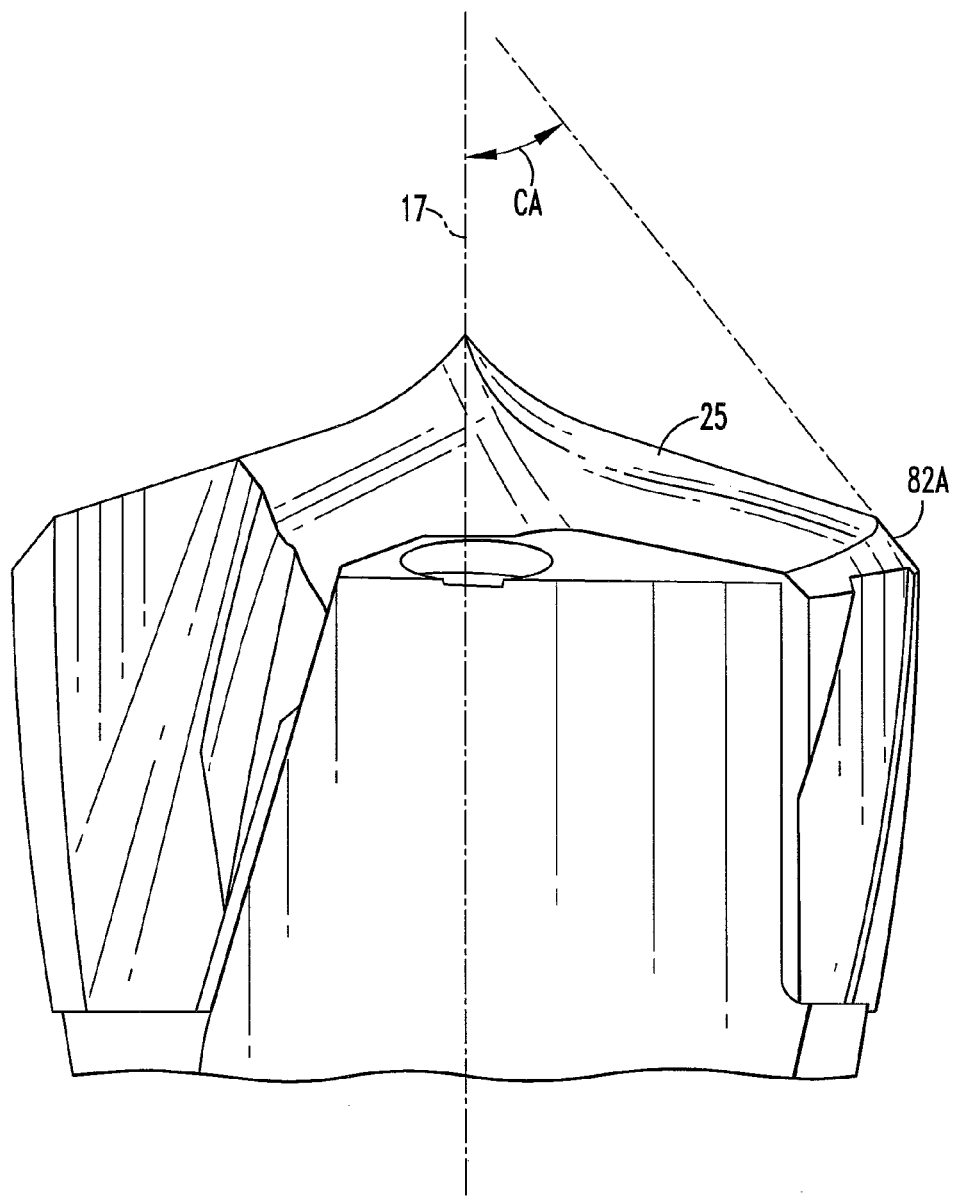
FIG. 4 is a side view of the top portion of the modular twist drill along arrows "4-4" in FIG. 2.

The embodiment illustrated in FIGS. 1-4 show a cutting tool 10 and a shank 12, wherein the tip body 25 is removable from the shank 12. As illustrated in FIG. 3, the tip body 25 is secured between two extending prongs 14A, 14B.

The cutting tool discussed herein is symmetric when viewed from the cutting end 20 and, as a result, only one-half of the cutting tool 10 will be discussed with the understanding that the symmetric side, which has so far been referenced using the "B" suffix, is symmetric. Therefore, the same discussion directed to the "A" side will apply to the "B" side.

The tip body land 37A has a pair of edges defined as a leading edge 40A and a trailing edge 42A. The rotatable cutting tool 10 and the associated tip body 25 are designed to operate in a single rotational direction indicated by arrow "45". As a result, the first portion of the tip body land 37A to contact a workpiece is defined as the leading edge 40A, while the remaining edge is the trailing edge 42A. The tip body land 37A is made up of a primary margin 47A and a secondary margin 49A spaced apart from one another on the tip body land 37A. The primary margin 47A is adjacent to the leading edge 40A and each of the margins 47A, 49A form with the opposing primary margin 47B and secondary margin 49B a margin diameter MD which is identical to the outer diameter 4. While the secondary margin 49A, illustrated in FIG. 2, contacts the trailing edge 42A, it is entirely possible and easily envisioned for the secondary margin 49A to be spaced from the trailing edge 42A in a direction closer to the primary margin 47A.

The margin diameter 50 extends along the entire length of the tip body 25 and is substantially constant. In particular, it is standard in twist drill designs to provide the cutting end of the drill with an outer diameter slightly larger than the region behind the cutting end. As an example, a twist drill may have a cutting end outer diameter that is approximately 0.05 millimeters greater than the drill outer diameter away from the cutting end, thereby providing clearance behind the cutting end. It is in this respect that the margin diameter 50 extends along the entire length of the tip body 25 and is substantially constant.

It should be appreciated that, with respect to FIG. 2, the margin diameter MD is the largest diameter of not only the tip body 25 but also of the shank 12 and the remaining segments of the periphery of the tip body 25 and the prongs 14 have a diameter that is less than the margin diameter MD.

A cutting lip 55A extends inwardly from the leading edge 40A of the tip body land 37A to an innermost end 57A.

A chisel edge 60 is defined by a line 63 connecting the innermost ends 57A, 57B of each cutting lip 55A, 55B.

It should be appreciated that the chisel edge 60 is defined by both the cutting lip 55A and the cutting lip 55B and, for that reason, will not be identified as two parts associated with the symmetry of the tip body 25.

When viewed along the central axis 17, the chisel edge 60 forms a chisel edge angle A with a line 65B extending radially inwardly from the leading edge 40B of the land 35B to the midpoint 67 of the chisel edge 63. The chisel edge angle A is between 80 degrees to 100 degrees and preferably, is approximately 90 degrees.

As illustrated in FIG. 2, the chisel edge 60 has an "S" shape with a generally straight central portion 69 in curved ends 70A, 70B. For example, the straight central portion 69 of the chisel edge 60 has a length of 0.25 millimeters for a drill having an outer diameter of between 12 millimeter and 13 millimeters.

As illustrated in FIG. 2, the chisel edge 60 transitions into the cutting lips 55A, 55B with curved ends 70A, 70B. These curved ends 70A, 70B have a radius of 0.4 millimeters to 1.5 millimeters for the outer diameter of 12 millimeters to 32 millimeters.

A gash 75A (FIG. 3) extends upwardly from the flute 30A to the chisel edge 60 and, in one embodiment, defines a positive rake angle R at the chisel edge 60 of between 2 degrees and 10 degrees.

Between the primary margin 47A and the secondary margin 49A is a recess 78A defined by a clearance diameter CD between opposing recesses 78A, 78B, which is less than the margin diameter MD.

The region between the land 35A and the chisel edge 60 is generally referred to as the flank 80A. Typically, the flank 80A meets the land 35A to form an edge. However, for improved strength, durability and to minimize blow out/breakout on exit for brittle materials, such as cast iron, a chamfer 82A may be introduced between the land 35A and the flank 80A. The chamfer 82A may form a chamfer angle CA (FIG. 4) of between 70 degrees and 90 degrees with the central axis 17.

As illustrated in FIG. 1, the cutting tool is a modular twist drill having a shank 12 that accommodates the tip 15. However, it is also possible and may be easily envisioned for the tip body 25 to be an integral part of the shank 12, thereby providing a solid drill.

It should also be noted that so far discussed has been a twist drill having helical flutes. The subject invention may also be applied to a twist drill having straight flutes.

As illustrated in FIG. 3, the tip 15 may be secured within the prongs 14A, 14B of the shank 12 using different techniques. In the embodiment illustrated herein, the tip body opposite the cutting end 20, as illustrated in FIG. 1A, is a threaded bore 85 along the central axis 17 for engagement with a mating bolt 105 having a head 107 which abuts against an internal shoulder 109 within the shank 12. It should be appreciated that other arrangements are known by those skilled in the art of machine tools for securing the tip 15 to the shank 12 including, but not limited to, prongs 14, which resiliently clamp the tip 15 to the shank 12.

The configuration of the shank 12 within the region of the tip 15 is such that when the tip 15 is mounted within the shank 12, the profile of the shank 12 conforms to the profile of the tip 15, such that, as illustrated in FIG. 1, the combination appears to be a unitary piece having continuous surfaces.

It should be noted that the cutting tool 10 may have coolant passages 110 running the length of the shank 12 and supplied with coolant at the base 13 of the shank. Additionally, as shown, the shank 12 has a tang 11 secured to a spindle (not shown) used to impart rotation to the cutting tool 10. The shank 12 may be secured to the spindle in any of a number of different ways known to those skilled in the art of drill manufacturing.

The tip body 15 may be made from a hard cemented carbide such as tungsten, titanium carbide or TiC—TiN. In general, the tip body 15 may be made from a hard wear-resistant material such as one of a number of refractory coated cemented carbide materials, which are well known in the art. Because of the expense associated with carbide tools, although it is possible, it is unlikely for both the tip body 25 and the shank 12 to be comprised of carbide materials and it is more likely that the tip body 25 is comprised of a carbide material, while the shank 12 is comprised of machine tool steel.

A cutting tool design in accordance with the subject invention provides superior results to other cutting tools. With respect to the hole straightness, tests were conducted using a modular twist drill having a diameter of 12.5 millimeters, a 140 degree point angle, and a 30 degree helix angle to drill blind holes having a depth of 125 millimeters. The workpiece was grey cast iron class 40 and the drill was advanced at a speed of 198 millimeters per minute and 0.35 millimeters per revolution. Additionally, coolant was introduced to the workpiece through internal passageways in the drill shank.

Under these circumstances, the following results were attained.

Case 1. A single margin drill having a chisel angle of 60 degrees achieved a hole straightness of 0.15 millimeters.

Case 2. A single margin drill having a chisel edge angle of 90 degrees achieved a hole straightness of 0.13 millimeters.

Case 3. A double margin drill having a chisel edge angle of 60 degrees achieved a hole straightness of 0.11 millimeters.

Case 4. A double margin drill having a chisel edge angle of 90 degrees, consistent with the subject invention, achieved a hole straightness of 0.04 millimeters. These unexpected results show the superiority of the design in accordance with the subject invention.

The chisel angle is also instrumental in minimizing "walking" of the drill along the workpiece. In particular, for a drill having a chisel angle of 60 degrees, the location error relative to the target location was 0.0042 millimeters while the location error utilizing a drill having a chisel edge angle of 90 degrees had a location error of 0.003 millimeters.

As can be seen, the drill in accordance with the subject invention provided not only unexpected but superior results to other designs.

As a result of the drill design disclosed herein, during the drilling process, the forces produced by the chisel edge encounter reaction forces on the margins from the hole wall along the same direction/line. This minimizes any imbalance in forces or moments on the drill, thereby reducing the tendency of the drill to walk and ensuring hole straightness and accurate hole positioning. This feature of the drill is very beneficial in a heterogeneous material such as grey cast iron, reputed for the difficulty in maintaining hole straightness. The chisel edge angle, as disclosed herein, provides a much superior hole straightness in conjunction with double margins, where secondary margins act to counterbalance any out-of-line forces. As illustrated in the cases described above, there is a 50% improvement in hole straightness utilizing a double-margin drill when the chisel angle is changed from 60 degrees to 90 degrees. Additionally, the hole location error is reduced by about 25% utilizing a drill having a chisel edge angle of 90 degrees as opposed to utilizing a drill having a chisel edge angle of 60 degrees.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. The tip of a generally cylindrical cutting tool used for making a hole within a workpiece, wherein the tip has a central axis and a cutting end and is designed to rotate in a cutting direction, wherein the tip comprises:
   a) a body having two diametrically opposed flutes with lands therebetween, wherein the lands each have a pair of edges defined as a leading edge and a trailing edge defined by the rotation of the tool;
   b) a primary margin and a secondary margin spaced apart from one another on each of the lands, wherein the primary margin is adjacent to the leading edge and the margins have the margin diameter along the entire length of the body that is substantially constant;
   c) a cutting lip extending inwardly from the leading edge of each land to an innermost end;
   d) a chisel edge defined by a line connecting the innermost end of each cutting lip;
   e) wherein when viewed along the central axis the chisel edge forms a chisel edge angle with a line extending radially inward from the leading edge of the land to the midpoint of the chisel edge; and
   f) wherein the chisel edge angle is between 80 degrees and 100 degrees.

2. The tip according to claim 1, wherein the chisel edge angle is 90 degrees.

3. The tip according to claim 1, wherein the chisel edge is "S" shaped with a generally straight central portion and curved ends.

4. The tip according to claim 3, wherein the straight central portion of the chisel edge has a length of 0.25 millimeters for a drill having an outer diameter of between 12 millimeters and 13 millimeters.

5. The tip according to claim 1, wherein the chisel edge transitions into the cutting lips and the transition area has a radius of 0.4 millimeters to 1.5 millimeters for an outer diameter of 12 millimeters to 32 millimeters.

6. The tip according to claim 1, wherein a gash extends upwardly from the flute to the chisel edge, wherein the gash defines a positive rake angle at the chisel edge.

7. The tip according to claim 1, wherein a recess between the margins is defined by a clearance diameter which is less than the margin diameter MD.

8. The tip according to claim 1, wherein the primary margin is adjacent to the leading edge on the land and the secondary margin is adjacent to the trailing edge on the land.

9. The tip according to claim 1, wherein the primary margin is adjacent to the leading edge on the land and the secondary margin is spaced from the trailing edge in a direction closer to the primary margin.

10. The tip according to claim 1, wherein a flank extends between the land and the chisel edge and, wherein there is a chamfer between the land and the flank.

11. The tip according to claim 10, wherein chamfer forms an angle of between 70 degrees and 90 degrees with the central axis.

12. The tip according to claim 1, wherein flutes are helical.

13. The tip according to claim 1, further including a twist drill having a shank with an end that accommodates the tip.

14. The tip according to claim 1, wherein the body has a threaded bore along the central axis for engagement with a mating bolt from a tool shank.

15. A rotatable cutting tool having a tip at a cutting end, wherein the tip comprises:
   a) a body having two diametrically opposed flutes with lands therebetween, wherein the lands each have a pair of edges defined as a leading edge and a trailing edge defined by the rotation of the tool;
   b) a primary margin and a secondary margin spaced apart from one another on each of the lands, wherein the primary margin is adjacent to the leading edge and the margins have the margin diameter along the entire length of the body that is constant;
   c) a cutting lip extending inwardly from the leading edge of each land to an innermost end;
   d) a chisel edge defined by a line connecting the innermost end of each cutting lip;
   e) wherein when viewed along the central axis the chisel edge forms a chisel edge angle with a line extending radially inward from the leading edge of the land to the midpoint of the chisel edge; and
   f) wherein the chisel edge angle is between 80 degrees and 100 degrees.

16. The cutting tool according to claim 15, wherein the tool has a shank and the tip body is removable from the shank.

17. The cutting tool according to claim 14, wherein the tip body has a threaded bore along the central axis for engagement with a mating bolt from the tool shank.

18. The cutting tool according to claim 1, wherein the tip body is an integral part of the tool shank.

* * * * *